(12) United States Patent
Blonde et al.

(10) Patent No.: US 10,063,830 B2
(45) Date of Patent: Aug. 28, 2018

(54) ANTIGHOSTING METHOD USING BINOCULAR SUPPRESSION

(71) Applicant: THOMSON LICENSING, Issy de Moulineaux (FR)

(72) Inventors: Laurent Blonde, Thorigne-Fouillard (FR); Dar'ya Khaustova, Donetsk (UA); Cedric Thebault, Chantepie (FR)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 85 days.

(21) Appl. No.: 14/360,648

(22) PCT Filed: Nov. 28, 2012

(86) PCT No.: PCT/EP2012/073871
§ 371 (c)(1),
(2) Date: May 26, 2014

(87) PCT Pub. No.: WO2013/143625
PCT Pub. Date: Oct. 2, 2013

(65) Prior Publication Data
US 2014/0320599 A1  Oct. 30, 2014

(30) Foreign Application Priority Data

Nov. 30, 2011 (EP) ..................................... 11306593
Mar. 30, 2012 (EP) ..................................... 12162641

(51) Int. Cl.
*H04N 13/00* (2006.01)

(52) U.S. Cl.
CPC ..... *H04N 13/0018* (2013.01); *H04N 13/0007* (2013.01)

(58) Field of Classification Search
CPC ............ G02B 27/0018; G02B 27/2264; G09G 2340/16; G09G 3/003; H04N 13/0003;
(Continued)

(56) References Cited

U.S. PATENT DOCUMENTS 5,995,631 A * 11/1999 Kamada ................. H04S 1/002
                                                                381/1
1,080,401 A1    4/2011 Tan et al.
(Continued)

FOREIGN PATENT DOCUMENTS

CN          101123736 A      2/2008
CN          101322418 A      12/2008
(Continued)

OTHER PUBLICATIONS

Mehrseresht et al., "An Efficient Content-Adaptive Motion-Compensated 3-D DWT With Enhanced Spatial and Temporal Scalability", IEEE Transactions on Image Processing, vol. 15, No. 6, Jun. 2006, pp. 1397-1412.
(Continued)

*Primary Examiner* — Nathnael Aynalem
(74) *Attorney, Agent, or Firm* — Tutunjian & Bitetto, P.C.

(57) ABSTRACT

The present invention provides a method of processing a source left view and a source right view of a 3D image comprising the steps of: identifying at least one ghosted region or ghosting region in the left view and/or in the right view; processing the identified regions in order to create a binocular suppression effect for this identified regions then providing a new 3D image formed by the processed left and/or right views.

9 Claims, 8 Drawing Sheets

(58) Field of Classification Search
CPC ........... H04N 13/0007; H04N 13/0037; H04N 13/0429; H04N 13/0434; H04N 13/0018; H04N 5/211; H04N 5/359; H04N 5/3597
USPC ...................................... 348/42, 51, 43, 614
See application file for complete search history.

(56) References Cited

U.S. PATENT DOCUMENTS

| | | | |
|---|---|---|---|
| 9,140,974 B2* | 9/2015 | Redmann | G03B 35/18 |
| 9,288,465 B2* | 3/2016 | Cowan | G02B 27/0018 |
| 9,384,535 B2* | 7/2016 | Tan | H04N 13/0018 |
| 2002/0110274 A1* | 8/2002 | Yamamoto | G06T 11/40 |
| | | | 382/154 |
| 2006/0268104 A1 | 11/2006 | Cowan et al. | |
| 2008/0036696 A1 | 2/2008 | Slavenburg et al. | |
| 2008/0158672 A1* | 7/2008 | McCosky | H04N 13/0431 |
| | | | 359/464 |
| 2009/0040297 A1* | 2/2009 | Harada | G02F 1/133509 |
| | | | 348/54 |
| 2010/0040280 A1* | 2/2010 | McKnight | G09G 3/003 |
| | | | 382/154 |
| 2011/0002533 A1* | 1/2011 | Inoue | G09G 3/003 |
| | | | 382/154 |
| 2011/0025832 A1 | 2/2011 | Cowan et al. | |
| 2011/0080401 A1* | 4/2011 | Tan | H04N 13/0018 |
| | | | 345/419 |
| 2011/0090243 A1 | 4/2011 | Park et al. | |
| 2011/0134228 A1* | 6/2011 | Matsumoto | G02B 27/2264 |
| | | | 348/55 |
| 2011/0199465 A1* | 8/2011 | Barenbrug | H04N 13/0018 |
| | | | 348/54 |
| 2011/0298795 A1 | 12/2011 | Van Der Heijden et al. | |
| 2011/0298903 A1* | 12/2011 | Inagaki | H04N 13/0025 |
| | | | 348/51 |
| 2014/0168206 A1 | 6/2014 | Barenbrug | |

FOREIGN PATENT DOCUMENTS

| | | |
|---|---|---|
| JP | 2001258052 | 9/2001 |
| JP | 2011040946 | 2/2011 |
| TW | 201043001 A | 12/2010 |
| WO | WO2005078663 | 8/2005 |
| WO | WO2010019922 | 2/2010 |

OTHER PUBLICATIONS

Vetro et al., "Overview of Multiview Video Coding and Anti-Aliasing for 3D Displays", Proceedings 2007 IEEE International Conference on Image Processing, San Antonio, Texas, USA, Sep. 16, 2007, pp. 17-20.

Woods, "Understanding Crosstalk in Stereoscopic Displays", Three-Dimensional Systems and Applications conference, May 19, 2010, Tokyo, Japan, pp. 1-11.

Weissman et al., "A Simple method for measuring crosstalk in stereoscopic displays", Proceedings of SPIE Stereoscopic Displays and Applications XXII, 2011, vol. 7863, pp. 1-11.

Srivastava et al., "Liquid Crystal Active Glasses for 3D Cinema", Journal of Display Technology, Oct. 2010, vol. 6, No. 10, pp. 522-530.

Saeki, "Shift to 3D Reignites TV Image Quality Competition", Nikkei Electronics Asia, Nov. 2010, pp. 1-13.

Bulbul et al:"A perceptual approach for stereoscopic rendering optimization", Computers and Graphics, Elsevier, GB vol. 34 No. 2, Apr. 1, 2010 (Apr. 1, 2010), pp. 145-147.

Winkler et al:"Stereoscopic image quality compendium", 200 8th International Conference on, IEEE, Dec. 13, 2011 (Dec. 13, 2011), pp. 1-5.

Lipscomb et al:"Reducing Cross talk between Stereoscopic Views",published in Proceedings of SPIE, vol. 2177, pp. 92-96.

Reynolds and Kenyon et al: "The Wavelot Transform and the suppression theory of binocular vision for Stereo image Compression", IEEE 1996, pp. 557-560.

Search Report dated Sep. 18, 2013.

Laurent Blonde, et al., 55.1: Diversity and Coherence of 3D Crosstalk Measurements, SID Symposium Digest of Technical Papers, Jun. 1, 2011, pp. 804-807, vol. 42, Issue 1, Blackwell Publishing Ltd.

* cited by examiner

ANTIGHOSTING METHOD USING BINOCULAR SUPPRESSION

This application claims the benefit, under 35 U.S.C. §365 of International Application PCT/EP2012/073871, filed Nov. 28, 2012, which was published in accordance with PCT Article 21(2) on Oct. 3, 2013 in English and which claims the benefit of European patent application No, 11306593.2, filed Nov. 30, 2011 and no 12162641.0, filed on Mar. 30, 2012.

The present invention concerns an image processing method and more particularly an antighosting method for attenuating visibility of crosstalk effect using binocular suppression.

The invention concerns the 3D displays including 3D TV or 3D Cinema. It relates to content creation or adaptation for 3D Cinema or 3DTV.

In the absence of a perfect 3D display technology, crosstalk has to be taken into account when studying the human visual perception of 3D stereoscopic content. To various degrees, all modern displays suffer from crosstalk, which can lead to a decrease of both video quality and visual comfort. In the worst case scenario, it can even prevent from proper binocular fusion. The influence of crosstalk on human perception is a complex problem to address as it is dependent on different aspects, including viewing conditions, content and disparity. Further investigations are still required to understand the perception of crosstalk and develop crosstalk reduction mechanisms.

The problem to be solved by the invention is to attenuate visibility of crosstalk happening on 3D displays when one image channel is leaking in the other image channel creating an unintended ghost image on or around objects.

Today crosstalk reduction is performed in post-processing or in the display signal processing, modifying or dimming the signal of the left and right view where leakage appears. This modification is computed to be a physical compensation of the light in excess or sometimes in default due to some effect like leakage.

In "the wavelet transform and the suppression theory of binocular vision for stereo image compression" from Reynolds & Kenyon, binocular fusion, rivalry and suppression is presented: "When the two eyes are presented with two similar images, the result is a single percept of the scene. This phenomenon is known as "binocular fusion".

On the other hand, when the two eyes are presented with two distinctly different images, instead of being combined the two images will be in competition with each other. This is known as "binocular rivalry". The final percept is an unstable shifting between the patterns of each eye. Because of this unstable combination of the two images, certain section of one image will dominate certain sections of the other image. This alternative of patterns results from a shift in dominance between each eye. Information of the less dominant image will be suppressed, while the information in the dominant image will be visible.

It is thus reported that binocular fusion depends on the spatial frequency relationship between the two images. For fusion to occur, either the low or high frequency or both components must be identical. If the low or high frequency components differ, binocular rivalry will occur and the image that contains the high frequency information in a particular section will dominate the final perception. Therefore we will have suppression of different frequency bands."

In the publication "Reducing Crosstalk between Stereoscopic Views" from Lipscomb and Wooten published in the Proceedings of SPIE, Vol. 2177, pp 92/96 (ISBN 0277-786X) an algorithm is presented which comprises a first step of anti-Crosstalk processing which first raises the image background up from black to dark grey generating a loss of contrast. It comprises a second step in which the crosstalk from (e.g.) the right view is estimated and subtracted from the left.

The subtraction balances the physically generated crosstalk, and then the crosstalk is hidden in the background raised level.

Figure 1:
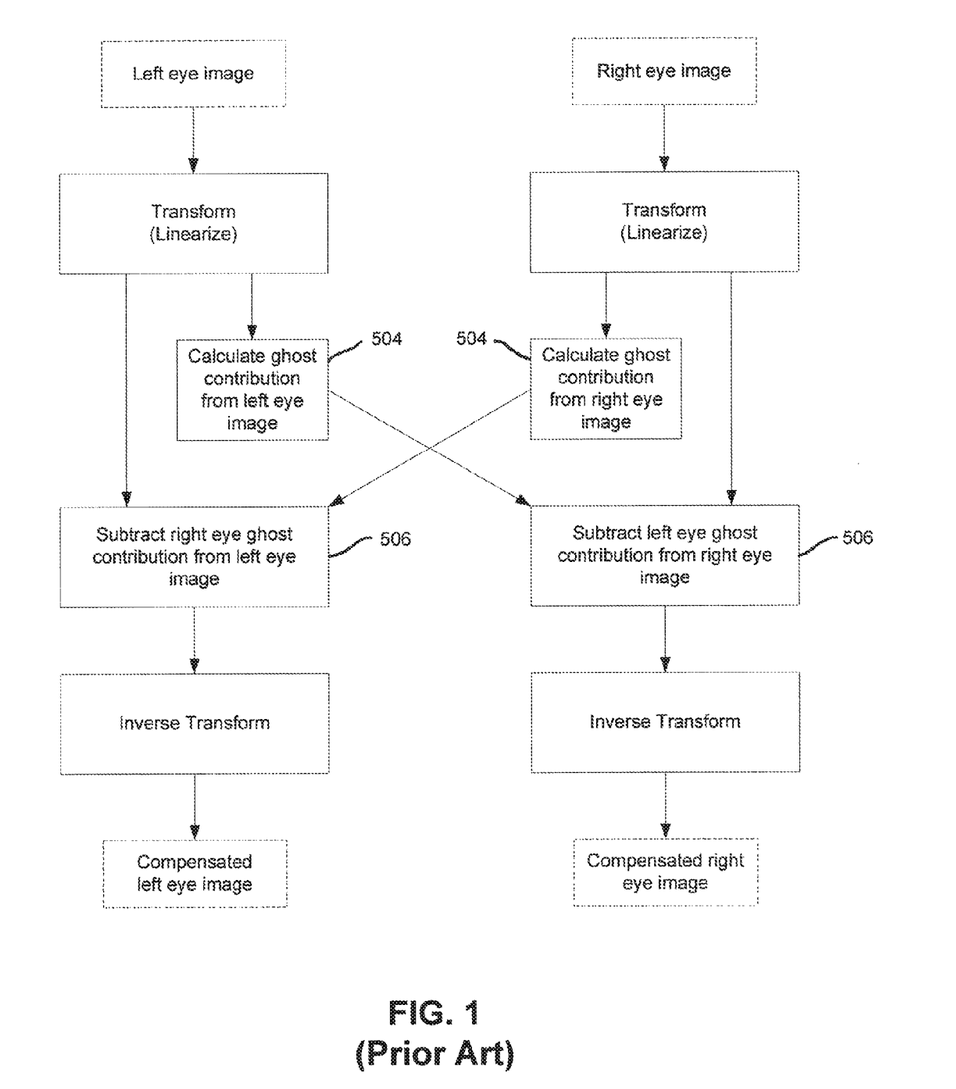
FIG. 1 is a block diagram of a used algorithm structure as known from the state of the art represented by the document US2011025832.

US2011025832—Ghost-compensation for improved stereoscopic projection—applies the same principle, adding a dependence of ghost coefficients upon different image regions/zones. US2011025832 discloses a method and system for reducing ghost images in piano-stereoscopic image transmissions. The method comprises the steps of establishing a plurality of expected ghosting profiles associated with a plurality of predetermined regions on a screen, and compensating for leakage in each predetermined region of a projected left and right eye images by removing an amount of ghost images leaking from the projected left eye image into the projected right eye image and vice versa. FIG. 1 represents the algorithmic structure which illustrates this method. The system comprises a processor configured to receive the quantity of ghost artifacts and compute ghost compensation quantities for left eye images and right eye images (bloc 504). The processor is further configured to remove an amount of actual image ghost artifacts leaking from a projected left eye image into a projected right eye image and vice versa (bloc 506). The processor is also configured to compute ghost compensation quantities for each of a plurality of zones, each zone corresponding to a region on a screen having an expected ghosting profile associated therewith.

Document WO2010019922—ENHANCED GHOST COMPENSATION FOR STEREOSCOPIC IMAGERY proposes to raise the background level in image regions where the above anti-ghost process is ineffective.

The existing antighost methods fail on two aspects which are:

Below a certain background level not enough light can be subtracted from the ghost contaminated view, and local background level increased for that purpose creates visible artifacts.

The existing methods depend on a precise model of the display system crosstalk, while it is known that crosstalk will depend on the angle of view, the display settings, etc. Also the need of a precise display crosstalk model makes the approach totally display dependent and a signal 'antighosted' for a given display model will not apply for another model or technology.

The objective of the present invention is to improve antighosting even in the worst case when a white signal leaks on a black portion of an image, and the same 'antighosted' signal is expected to be applied to different stereoscopic display models.

The present invention provides a method of processing a source left view and a source right view of a 3D image. The method comprises the steps of identifying at least one ghosted region or ghosting region in the left view and/or in the right view and processing the identified regions in order to create a binocular suppression effect for this identified regions then providing a new 3D image formed by the processed left and/or right views.

In a preferred embodiment the step of processing the identified region comprises changing the contrast in order to generate binocular suppression in the identified regions.

In a preferred embodiment the step of processing the identified regions consists in filtering the high spatial frequencies in the identified regions.

In a preferred embodiment the step of processing the identified regions consists in blurring the identified regions.

In a preferred embodiment the step of processing the identified regions consists in modifying the color of the identified regions by de-saturating the color of the identified regions In a preferred embodiment the step of identifying at least one ghosted region or one ghosting region is performed using a ghost simulation.

In a preferred embodiment the blurring of the identified regions is performed according to the following steps:
- calculating a left and/or a right alpha masks wherein the parameter alpha of those masks is determined, in a range of values comprised between 0 to 1, such that it is closed to 1 in the identified regions and closed to 0 out of the identified regions,
- blending the original left view with the blurred left view with the alpha mask of the left view and/or blending the original right view with the blurred right view with the alpha mask of the right view, the obtained blended left/right view being the addition of an alpha part of the blurred left/right view and a (1-alpha) part of the original left/right view.

In a preferred embodiment the method comprises furthermore the step of modifying left and right alpha masks, in exchanging disparity information between the left and the right alpha masks taking account of the disparity card, such that the quality of the image in the crosstalk generating region is decreased and the quality of the image in the corresponding region is increased and the step of filtering for filtering left and/or right alpha masks belonging to the same object in the left and/or right view so that double processing is avoided.

In a preferred embodiment the method is applied on the 3D content, at the post-production level.

In a preferred embodiment the method is applied on the 3D content, as a set-top box or gateway embedded processing.

The above and other aspects of the invention will become more apparent by the following detailed description of exemplary embodiments thereof with reference to the attached drawings in which.

Hereinafter, the present invention will be described more fully with reference to the accompanying drawings, in which exemplary embodiments of the invention are shown.

The proposed solution does not entirely rely on physics as previous solutions but on some aspects of binocular perception.

As a recall, crosstalk effect or ghosting on 3D displays is characterized by the visibility of an unintended image mixed partially with an intended image. An example is the leakage of light intended to the right eye into the left eye vision channel of an observer.

In the present invention, the idea is not to suppress or cancel the unintended light signal emitted, but to modify the left and right images so that the observer does not see or perceives much less this unintended light signal.

The perceptual phenomenon offering this possibility is called "Binocular Suppression", resulting from a selection done by the visual system when two different images are presented to the eyes. While some configurations lead to binocular rivalry, many configurations simply lead to the suppression of one of the two available images (left or right view), the visual system taking care of the perception of depth coherence thanks to other cues than binocular disparity. Typically, blurred patterns are suppressed by sharp ones because of both their lower contrast and their loss of high spatial frequencies. While eye dominance may have influence, only the most contrasted (left or right) view and the one with highest spatial frequency will be seen, while the other one is suppressed or is seen with much less contrast or not seen at all. While alteration of high spatial frequencies (blur) are one way to trigger binocular suppression, other image modifications can as well be used as average level dimming, color alteration (such as desaturation) or change of the local orientation of the image information.

The point is to force a binocular choice between the left and right view, with one of the two images of the pair being processed in order to be suppressed, the other image of the pair being processed to be retained in the percept, and avoiding too much difference in order not to trigger rivalry. The alternation of the left and right percepts creates annoyance.

The solution proposed is to modify the image information in selected image regions of one of the two (left or right) views of a stereo pair when these regions are source of crosstalk for the other view.

This modification of the image information is made so that the modified selected regions become preferably suppressed by the binocular vision system and the corresponding, unmodified regions, in the other view become predominant. In one preferred embodiment, the selected regions are blurred.

In complement, the corresponding image information via a disparity displacement in the other view of the stereo pair can be processed so that this other view is privileged in the binocular vision process and part of the percept. The visual attention is thus reported in this privileged other view.

The visual attention is this capacity of the human visual system to quickly select the most relevant data of an image or a video sequence. The principal objective of this behavior is double: to reduce the quantity of information to treat and provide to the vision system only information essential to the task to be achieved.

Binocular suppression is a common phenomenon, acting unconsciously in our daily life. For example when an object is close in our field of view and we look far, at a distant scene, parts on the left and on the right of the close object will dim or disappear (be suppressed) to privilege the distant scene information where our conscious attention is directed at. It corresponds to a 'see through' experience.

For the observer, the expected advantage is a better quality of the perceived 3D images, with less annoyance created by ghosting. For the display manufacturers a first advantage is to address ghosting configurations not addressable with current solutions such as light leaking on very dark parts of the images (physical crosstalk contrast is high in this configuration and cannot be corrected by subtracting light)

A second advantage is the better stability of the antighosting processing as a precise model of crosstalk is less needed than in current methods.

The invention is identified in a product as from the analysis of the content, image regions creating ghosting (which can be identified using a crosstalk simulator) will appear modified on their right of left view for crosstalk generation regions, with an alteration of their image information, like blurring, average level, contrast change, orientation change or color change, and with possibly local reinforcement of image information for the other (left or right) view in the corresponding regions (i.e. corresponding via a disparity displacement).

The invention can take for example the form of a base algorithm, applied on the stereoscopic or more generally 3D content, at the post-production level or as a set-top box or gateway embedded processing.

Figure 2:
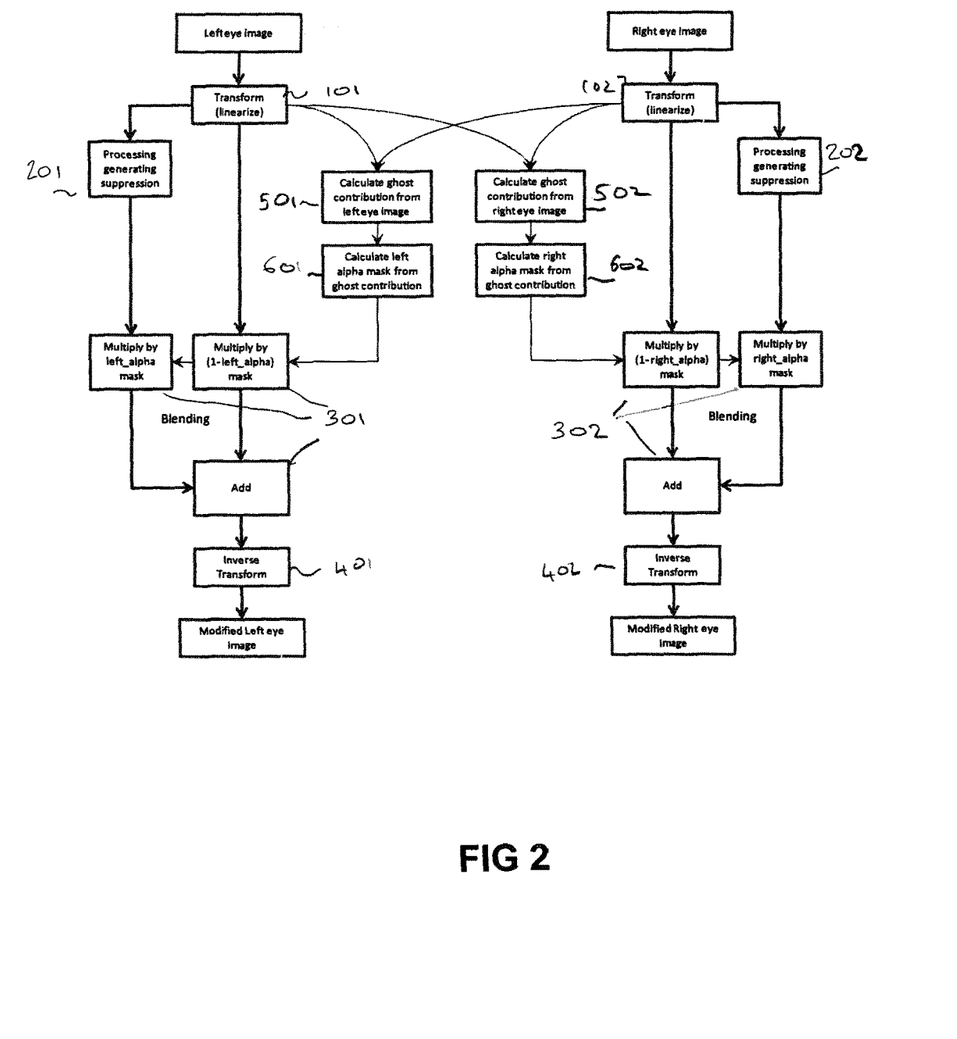
FIG. 2 is a block diagram of an antighosting algorithm structure.

A base algorithm is depicted on FIG. 2 where two processing paths can be identified:
Image processing
Mask processing
Image Processing:

Image processing consists first in a linearization step (101,102) to linearize the visual space into a linear space in order to realize subsequent computations in a linear space.

As a second step, a processed version of the left and right image signals is performed (201,202). Processing can be for example blurring, average level, contrast change, orientation change or color change or any change proper to generate binocular suppression. The strength of processing, and the horizontal and vertical extent of processing are parameters of the algorithm. Successful tests were performed with a Gaussian filter of horizontal extent of 31 pixels and a vertical extent of 5. Vertical extent can be smaller than horizontal extent as crosstalk acts in the horizontal dimension.

The third step (301,302) is a performing step to perform a blending operation between the original—left or right—image signal and its corresponding processed left or right image signal. The blending is performed using an alpha mask which will be determined by the following mask processing path. alpha (varying between 0.0 and 1.0) being a coefficient determining the proportion of processed content for each pixel in the resulting image. For each pixel of the left and right images a weighted average is performed. The modified image signal being the addition of an alpha part of the processed image signal and a (1−alpha) part of the original image signal:

[modified image]=alpha×[processed image]+(1−alpha)×[original image]

When coefficient alpha is close to 1.0 the processed version of the image signal is privileged, when coefficient alpha is close to 0.0, the original image signal is preserved. All intermediate values allow a smooth transition between these two states.

To increase the probability of suppression, a combination of different processing can be performed.

For example, a luminance attenuation coefficient may be applied on a local orientation modified signal, further increasing predominance of the other view.

Then the formula becomes:

[modified image]=beta×alpha×[local orientation modified image]+(1−alpha)×[original image]

beta being the luminance attenuation coefficient, with a value between 0.0 and 1.0, preferably close to 1.0, typically beta=0.9.

The final step in the image processing path (401, 402) is to apply the adequate "gamma" transform from the linear space used for processing to the display space intended for the modified content thus obtaining left and right modified images reducing the saliency of the crosstalk effect.
Mask Processing:

The goal of mask processing path is first to identify the pixels of crosstalk regions where processing should be applied and, in an example implementation, to compute a proportion corresponding to the coefficient alpha for blending locally the low-pass filtered image with the original image. The mask is acting as an alpha channel in video processing or computer graphics. To perform the desired effect of binocular suppression removing crosstalk, the images shall be blurred in the crosstalk generating regions of a given view, so that, there, the other view is selected by the visual system. For that, coefficient alpha shall be high (close to 1.0) in regions generating crosstalk, and low (close to 0.0) where no crosstalk is generated. Mask transitions shall be smooth to avoid creating artificial edges due only to the blending process. The first step of mask processing 501, 502 is to calculate the ghost contribution from the left and right images. This is performed using a ghost simulation, as described in cited document US20110025832 for example. The system crosstalk contrast can be relevant information as a first step for initial mask generation.

Second and third steps are part of the "Calculate left-(or-right) alpha mask contribution" blocks 601, 602 in FIG. 2. The image of mask and at the beginning a binary image (levels 0 or 255 only) where 255 represents zones, for a right or left view, which generate a ghost in the other view.

These binary images, can present artifacts in the form of small spots for example. According to a preferred embodiment of the invention these artifacts should be treated.

Thus, the second step consists in processing spatially the initial mask. The initial mask is then processed for example with mathematical morphology operations to remove small image elements. This topological output will be still binary (0 or 255) if the structuring elements are binary, or in levels of gray (between 0 and 255) if the structuring elements are themselves in levels of gray. The resulting mask can then be low-passfiltered to avoid the effects of edge, in particular in the binary case.

The third step consists in applying a look up table (LUT) on the obtained images signal to adapt the levels of the processed initial mask (between 0 and 255) to values of the parameter alpha in order to bring back the range of level 0 to 255 to a range of levels 0 to 1 that it should take to perform the intended blending. 0 corresponds to alpha=0 and 255 corresponds to alpha=1. This function is linear.

But in an embodiment of the invention, this function is nonlinear so that it will make it possible to better adjust the contribution of an image in the other one.

The LUT table is a table of correspondence between discrete levels of entry and discrete levels of exit. Here a LUT 1D, mono dimensional, is used which transforms a range [0, 255] into another range [0, 1] by not reaching inevitably all the levels and by duplicating some.

Other image processing techniques like local blurring using the alpha images as blur strength parameter may lead to a similar result.

This calculated alpha mask is then used in the image processing, as described above, to perform the blending operation.

Some stereoscopic singularities may appear concerning this algorithm. For example when a thin bright object is presented on a dark background, ghosting will appear on both sides of the object. When applying the algorithm above, both the left and right view of this object will be processed, and no original quality version will be available for the visual system to reconstruct a percept close to the original intended image.

Figure 3:
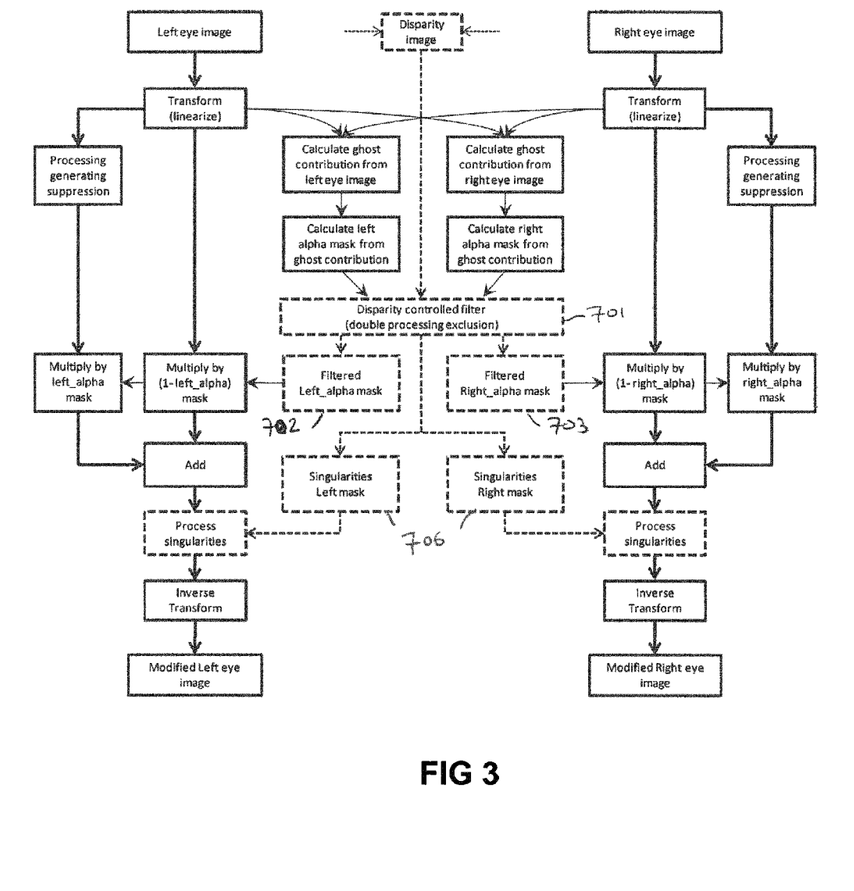
FIG. 3 is a block diagram of an antighosting algorithm structure comprising managing singularities.

FIG. 3 indicates a processing structure (dashed lines blocks and arrows) to manage these singularities. This processing structure will exploit as input a disparity image indicating the local displacement of objects in the image plane between the left and right view. This disparity can be available with—or computed from—the left and right eye images. The main processing block 701 is a "disparity control filter" acting of the left and right alpha masks. This filter will perform two operations:

Exclude from the left and right alpha mask regions belonging to the same object, to avoid double processing and a resulting blurred percept. The filtered left and right alpha mask 702, 703 is further used in the image processing to perform the blending operation.

Creating "Singularities masks" for the left and right views allow a singularity processing step 706 to be performed for these areas after the blending operation is performed.

Singularity processing may take various forms. For example:
 Processing one of the two views only: Crosstalk will remain, but only on one side and the main percept will remain correct without blur.
 Modifying disparity to cancel down crosstalk.

While the base algorithm consists in decreasing the quality of a crosstalk generating region in one—left or right—view, the idea here is to reinforce or enhance quality in the corresponding region in the other view. In this way, the main percept will be reinforced and the balance between the intended image region and the unintended image region (the processed one) will be more in favor of the intended one in the binocular suppression mechanism.

Figure 4:
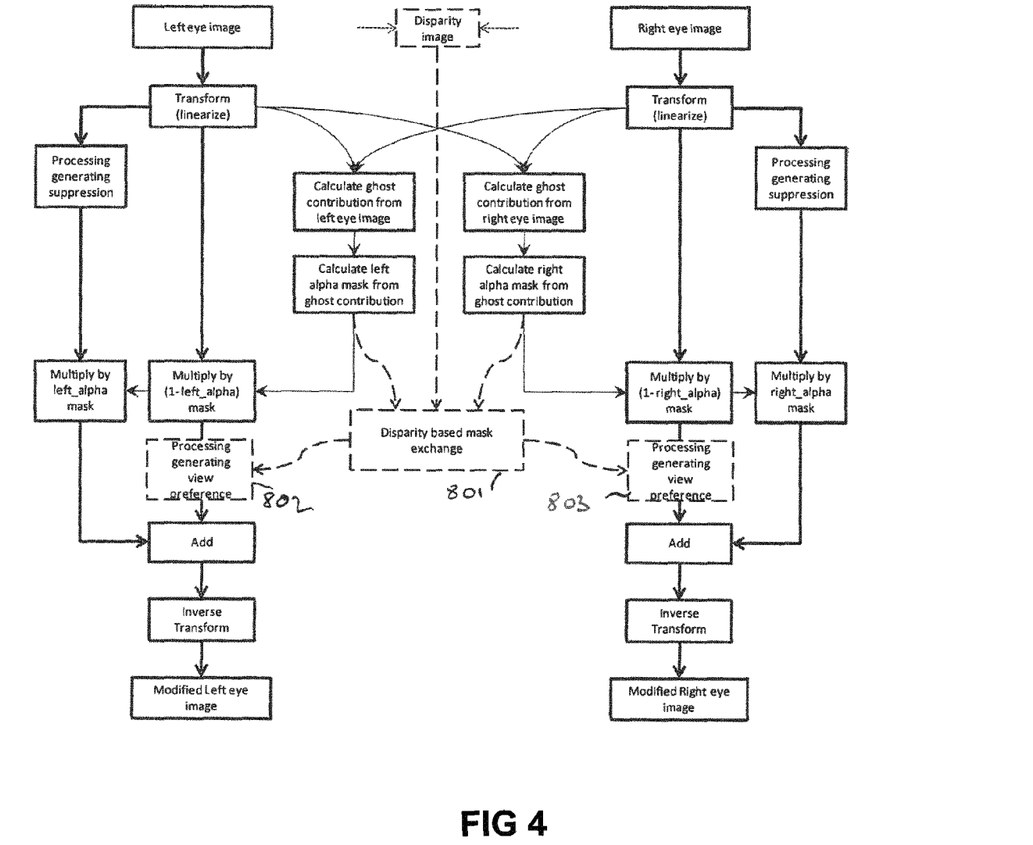
FIG. 4 is a block diagram of an antighosting algorithm performance enhancement by local processing.

To realize this, a possibility is in the step 801 to exchange the left and right alpha masks, taking into account disparity, and to apply a sharpening filter weighted by this modified alpha mask. FIG. 4 indicates a processing structure (dashed lines blocks) to manage these exchanges.

The exchange of masks should take disparity into account to relocate the alpha masks' areas on the corresponding regions of the objects in the other view (regions aligned then with the processed areas of the former view when watching 3D).

In the step 802, 803, part of the original right or left image signal is thus reinforced by this processing generating view preference before being added to the corresponding processed image signal.

Some parameters like the amount of blur which is determined by the low pass filter parameter may need to be adjusted depending on the user's sensitivity. The high spatial frequencies are so suppressed. This is applicable for comfort optimization in single user configurations or few users configurations with similar perceptive characteristics.

In one embodiment, a modified version of the left and right images consists in modifying the color of the identified crosstalk regions of the left or right image by de-saturating the color of the identified crosstalk regions and compensating for this color de-saturation in the homologue region of the other—right or left—view.

The singularities processing could also take into account the user's dominant eye.

Figure 5:
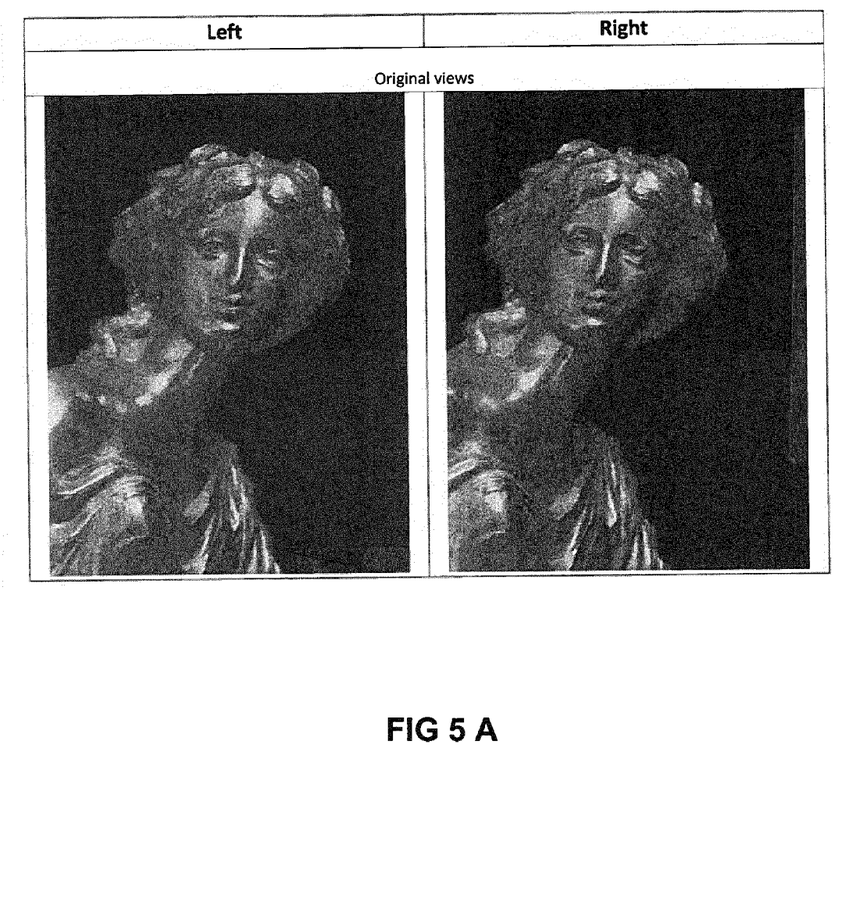
FIG. 5a-5d corresponds to a processing illustration.

FIGS. 5a-5d illustrates the processing:
FIG. 5a illustrates the left and right original views.

FIG. 5b illustrates the left and right views with crosstalk (simulation) as regions from the other view generate ghosts. On the left view, arrows shows crosstalk generated by right view regions and on the right view, arrows shows crosstalk generated by left view regions.

FIG. 5c illustrates the region generating crosstalk which is processed (blurred in this example).

FIG. 5d illustrates the difference between processed views and original views indicating the improvements due to the process. High frequencies that have been removed by the blurring process are visible on these difference images.

As the ghosting attenuation is perceptual it cannot be rendered in this document but only on a 3D display exhibiting crosstalk.

The percept is: when a left image region is processed (here blurred), only the corresponding right image region is perceived and vice-versa.

Ghosting perception is strongly attenuated, thus the saliency of the crosstalk effect is reduced. Potential applications are antighosting for 3D displays such as TV—, cinema—, games displays as with this invention, perceived quality for 3D images and videos is improved.

The invention claimed is:

1. A method of processing a source left view and a source right view of a 3D image comprising:
 identifying at least one ghosted region or ghosting region in an original left view and/or in an original right view in a linear space;
 processing said at least one identified ghosted region or ghosting region by performing a blurring of said at least one identified ghosted region or ghosting region in order to create a binocular suppression effect for said at least one identified ghosted region or ghosting region then providing a new 3D image in a display space formed by the processed left and/or right views in said linear space, said blurring comprising removing high spatial frequencies in said at least one identified ghosted region or ghosting regions, and wherein the processing further comprises a singularity processing that takes into account a user's dominant eye.

2. The method of processing according to claim 1, wherein identifying at least one ghosted region or one ghosting region is performed using a ghost simulation.

3. The method of processing according to claim 1, wherein processing said at least one identified ghosted region or ghosting region comprises changing a contrast in order to generate binocular suppression in said at least one identified ghosted region or ghosting region.

4. The method of processing according to claim 1, wherein processing said at least one identified ghosted region or ghosting region comprises modifying color of said at least one identified ghosted region or ghosting region by de saturating color of said at least one identified ghosted region or ghosting region.

5. The method of processing according to claim 1, wherein the blurring of said at least one identified ghosted region or ghosting region comprises:
 calculating a left and/or a right alpha masks wherein a parameter alpha of those masks is determined, in a range of values comprised between 0 to 1, such that it is closer to 1 in said at least one identified ghosted region or ghosting region and closer to 0 out of said at least one identified ghosted region or ghosting region,
 blending the original left view with a blurred left view with the alpha mask of the left view and/or blending the original right view with the blurred right view with the alpha mask of the right view, and delivering an obtained blended left/right view being an addition of an alpha part of the blurred left/right view and a (1-alpha) part of the original left/right view.

6. The method of processing according to claim 5, wherein said blurring further comprises modifying left and right alpha masks, in exchanging disparity information between the left and the right alpha masks taking account of the disparity map, such that a quality of image in the crosstalk generating region is decreased and a quality of image in the corresponding region is increased.

7. The method of processing according to claim 6, wherein said blurring further comprises filtering left and/or right alpha masks belonging to a same object in the left and/or right view so that performing a double processing is avoided.

8. The method of processing according to claim 1, wherein the method is applied on 3D content, at the post-production level.

9. The method of processing according to claim 1, wherein the method is applied on 3D content of a set-top box or gateway embedded processing.

\* \* \* \* \*